Nov. 13, 1923.　　　　　　　　　　　　　　1,474,121
B. F. SEYMOUR
RESILIENT TRANSMISSION AND BEARING
Filed June 7, 1919

Inventor
B. F. Seymour,
By
Attorney

Patented Nov. 13, 1923.

1,474,121

UNITED STATES PATENT OFFICE.

BENJAMIN F. SEYMOUR, OF WASHINGTON, DISTRICT OF COLUMBIA.

RESILIENT TRANSMISSION AND BEARING.

Application filed June 7, 1919. Serial No. 302,411.

*To all whom it may concern:*

Be it known that I, BENJAMIN F. SEYMOUR, a citizen of the United States, residing at Washington, in the District of Columbia, have invented certain new and useful Improvements in Resilient Transmissions and Bearings; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The invention is shown by way of illustration in the accompanying drawings wherein—

Figure 1:
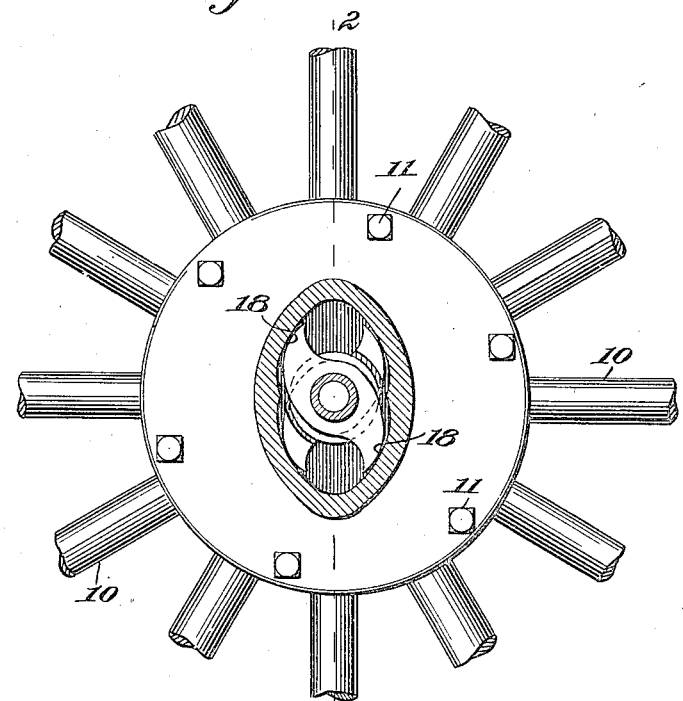
Figure 3:
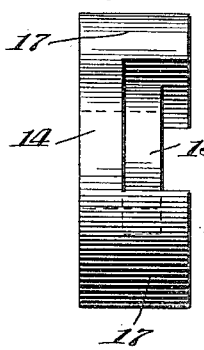
Figure 2:
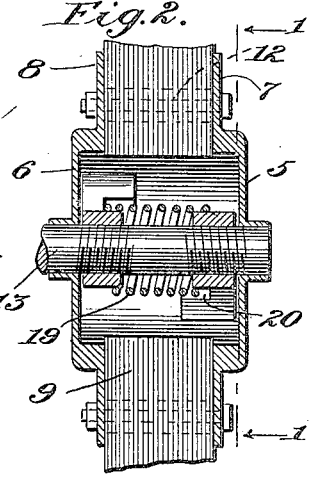
Figure 4:
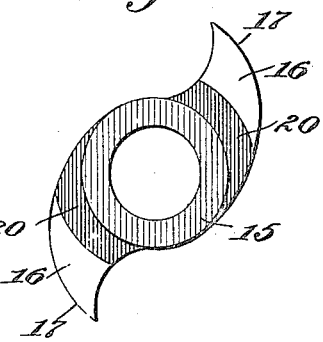

Figure 1 is an elevational view of part of a wheel and partly in section on the line 1—1 of Figure 2, and with the device in applied position, Figure 2 is a central sectional view taken on the line 2—2 of Figure 1, Figure 3 is an end elevational view of one of the transmission and bearing members, and Figure 4 is a side elevational view thereof.

Referring to the construction in further detail and wherein like reference characters designate corresponding parts, the construction consists of a hub portion formed of two side plates or housing members 5 and 6, which are respectively provided with annular bearing portions 7 and 8 disposed against the inner rim portion 9 of the wheel whose spokes 10 are carried by said rim portion, as will be understood. The two hub members 5 and 6 are secured to the wheel rim by the series of bolts 11 that pass through the bearing portions 7 and 8 of said members (5 and 6), and through slotted portions 12 in the rim 9, as indicated in Figure 2. It will be understood of course that said slotted portions are provided to allow the wheel rim to have limited radial movement with respect to the axis 13 of the wheel.

The resilient transmitting and bearing device per se consists of two members 14 that are screw-threaded in opposite directions on the shaft 13 (see Figure 2) to the end that said members may work toward and from each other in their operation to be now explained.

Each of the members 14 has a hub portion 15 that is internally screw-threaded for mounting on the shaft 13, and radiating from the hub is a pair of oppositely pitched cam elements 16 whose active faces 17 bear in frictional contact with the complementary cam elements formed on the inner surface of the elliptical portion 18 of wheel rim 9, as clearly shown in Figures 1 and 2.

The cam elements 16 of the two members 14 are oppositely disposed and held in this relation under appreciably powerful tension by the torsion spring 19 which fits about the axle 13 and around the inner hub portions 15 of said members. The respective ends of said spring are of course anchored or otherwise fixed within the undercut portions 20 of said members 14.

It will therefore be seen from the foregoing that any turning of the shaft 13 will impart rotation to one of the members 14, against the torsion of the spring, and this rotation will transmit a like movement to the wheel rim and that such transmission will be flexible or resilient in nature. And it will be further seen that any jarring action imparted to the wheel rim will be taken up by the spring and the cooperating cam elements 16 and 18 formed on the members 14 and the rim portion 9. It will be seen that the limit of movement of the two members 14 will be determined wholly by the space within the central rim portion 18, and therefore any likelihood of binding or jamming between said members 14 and the hub plates 5 and 6 is avoided.

It will be obvious of course that different forms of construction may be provided in lieu of that disclosed and described herein. And while I have shown and described certain apparatus for accomplishing the result initially stated it is to be understood that I am not limited to the precise details shown but may on the other hand adopt such modifications or changes within the scope of the claims to better suit the end in view.

Having thus described my invention, what I claim is:

1. In a combined resilient bearing and transmission, the combination of a driving element, a driven element, movable radially of the driving element, a pair of spring-torsioned and pivotally mounted members carried by one of said elements, and means associated with the other element co-operable with said pivoted members to provide a resilient bearing and transmission between said elements, for the purpose set forth.

2. In a combined resilient bearing and transmission, the combination of a driving element, a driven element movable radially of the driving element, a pair of spring-torsioned and pivotally mounted members carried by one of said elements, and means associated with the other element and holding said pivoted members under tension to provide a resilient bearing and transmission between said elements for the purpose set forth.

3. In a combined resilient bearing and transmission, the combination of a driving shaft, a driven element movable radially of the driving element, a pair of spring torsioned members mounted on said driving shaft, and means on said driven element engaging with said members and holding the same under tension, to provide a resilient bearing and transmission for the purpose set forth.

4. In a combined resilient bearing and transmission, the combination of a driving shaft, a driven element movable radially of the driving element, a pair of spring torsioned cam members mounted on the driving shaft, and said driven element constructed to engage and hold said members under tension and providing a resilient bearing and transmission between said elements for the purpose set forth.

5. In a combined resilient bearing and transmission, the combination of a driving shaft, a hub portion, a wheel rim movable radially of the hub portion, a pair of spring-torsioned cam members mounted on said shaft within the hub portion, and said rim portion engaging with said cam members and holding the same under tension to provide a resilient bearing and transmission for the purpose set forth.

6. In a combined resilient bearing and transmission, the combination of a driving shaft with oppositely pitched threads, members screwed on said threads, a spring holding said members under tension, a wheel having a hub embracing said members and co-operable therewith to provide a resilient bearing and transmission for the purpose set forth.

7. In a combined resilient bearing and transmission, the combination of a driving shaft having oppositely pitched threads, a pair of dogs adjustable on said threads, a spring holding said dogs normally under tension, and a wheel having a hub mounted on said shaft and embracing said dogs, said wheel hub constructed to engage with said tensioned dogs and provide a resilient bearing and transmission for the purpose set forth.

8. In a combined resilient bearing and transmission, the combination of a driving shaft having oppositely pitched threads, a pair of dogs adjustable on said threads, a tensioned spring between said dogs, and a wheel having a hub mounted on and embracing said dogs, said wheel hub having elliptical portions engaging said dogs and providing therewith a resilient bearing and transmission, for the purpose set forth.

In testimony whereof I affix my signature.

BENJAMIN F. SEYMOUR.